Patented Aug. 6, 1935

2,010,337

UNITED STATES PATENT OFFICE 2,010,337

PROCESS FOR STABILIZING ACID LIQUOR

Adrianus Johannes van Peski, Amsterdam, Netherlands, assignor to Shell Development Company, San Francisco, Calif.

No Drawing. Application July 21, 1932, Serial No. 623,904. In the Netherlands July 25, 1931

12 Claims. (Cl. 23—250)

It has already been proposed to effect the absorption of olefines in strong acids, such as sulphuric acid, phosphoric acid, chlorosulphonic acid, strong sulphonic acids etc. in the presence of absorption-promoting substances. In this connection reference is made to U. S. Patent 1,944,622 issued January 23, 1934, U. S. applications Ser. No. 453,404, filed May 17th, 1930; Ser. No. 454,197, filed May 20, 1930; U. S. Patent 1,948,891 issued February 27, 1934, U. S. Patent 1,958,578 issued May 15, 1934, and U. S. application Ser. No. 608,872, filed May 2nd, 1932. In many cases it appeared that besides this desired effect the formation of undesired unsaturated products, in consequence of the polymerization of the products or of the olefines themselves, was obviated, which must be ascribed to the polymerization-hindering capacity of the adsorption-promoting substances.

It has now been found that the polymerization-hindering capacity of these substances can be utilized not only during the absorption of the olefines but also in those cases where besides free strong acids (such as sulphuric acid, phosphoric acid, chlorosulphonic acid, strong sulphonic acids, etc.), alcohols, olefines, alkyl- and/or dialkyl compounds of the strong acids or other polymerizable compounds are present. Consequently the process according to the invention consists in the addition to or the formation in these mixtures of substances hindering the polymerization of the compounds contacted with the free strong acids.

Thus, for instance, according to the invention use is made of one or more, hydrous or anhydrous, complex metallic cyanides and/or compounds the chemical formula of which can be derived from these cyanides, e. g. ferrihydrocyanic acid, ferrohydrocyanic acid, or salts of these acids. It is also possible to use one or more compounds of hydrocarbons with one or more double carbon bonds in the molecule, such as propylene, normal butylene, isobutylene, tri-methyl ethylene, diamylene, isoprene, cyclohexene, pinene, with complex metallic cyanides, such as potassium ferrocyanides, ferrohydrocyanic acid or ferrihydrocyanic acid.

According to another embodiment of the process according to the invention one or more metals of the platinum group or compounds thereof are used in a finely divided condition and preferably on a carrier, e. g. $PtCl_4$ on carbon black, rhodium black, etc.

Still another embodiment of the process according to the invention resides in the use of soluble compounds of the metals of the platinum group of copper, iron, cobalt, nickel or silver, for instance cuprocyanide. If desired soluble complex compounds can be formed in the acid liquid by converting in this liquid soluble (such as cuprocyanide) or insoluble (such as potassium platinochloride) non-complex compounds of these metals with the aid of carbon monoxide, nitrogen oxide or ethylene.

In all these cases the mixtures can be stored during a longer time and at higher temperatures than in the absence of the relative polymerization-hindering substances.

The addition to or the production in the mixtures of substances hindering the polymerization of the compounds with the free strong acids can be applied in many instances. Thus, for example, in order to stabilize the products obtained by the absorption of olefines in a strong acid in the absence of polymerization-hindering substances, it is possible to add such substances afterwards.

Also in those cases where a mixture of alkylated acid and strong acid has to undergo a not sufficiently rapid reaction with a third substance, it can be brought about by the addition of polymerization-hindering substances that the alkyl acid originally present remains present until the end of the reaction, instead of being converted into useless polymers.

Furthermore polymerization-hindering substances can be added also to mixtures of alcohols, strong acid and substances which have to interact with the alcohols under the influence of the strong acid.

Moreover the polymerization-hindering capacity can be turned to account in those cases where strong acid is gradually added to a reaction mixture containing olefines, e. g. a mixture of olefines and phenols (or aromatic sulphonic acids), in order to bring about an interaction between the olefines and one or more of the other components.

It goes without saying that besides those mentioned above many other modes of applying the process are conceivable, likewise falling within the scope of the invention.

Example I

In a solution containing 30.6 grams secondary butyl sulphuric acid 70.6 grams sulphuric acid and 10.9 grams water, all the secondary butyl sulphuric acid present has been converted after 5 hours at 20° C. into unsaturated butylene polymers, whilst no alcohols could be obtained from the mixture by applying the known hydrolysis.

Upon 3 grams of $K_4Fe(CN)_6 3H_2O$ being added to the same original solution, only 14% of the butyl sulphuric acid were polymerized under otherwise identical conditions whilst after hydrolysis 11 grams of butyl alcohol could be obtained from the non-polymerized product.

*Example II*

160.5 grams of a solution of a 96% sulphuric acid, into which 0.2 gram molecule of propylene had been absorbed per gram molecule of sulphuric acid, was stored for 5 hours at 20° C. and then diluted to a 20% sulphuric acid by pouring it into the calculated quantity of ice. 3.7 grams of isopropyl alcohol were subsequently obtained by distillation, the quantity polymerized amounting in total to 8.7 grams.

Upon 3 grams of cuprocyanide being dissolved in the same original solution only 0.3 gram was polymerized under otherwise identical conditions, whilst after hydrolysis 13.3 grams of butyl alcohol was obtained from the non-polymerized product.

The expression "acid liquor" as used throughout the specification and claims is intended to embrace acid solutions (true or colloidal) of alcohols, olefines and alkyl acid esters, dialkyl esters and neutral esters of strong acids, and similar polymerizable compounds wherein the acid medium is a free strong acid as sulfuric acid, phosphoric acid, chlorosulfonic acid, the sulfonic acids and the like.

What I claim is:

1. A process for stabilizing preformed acid liquor which comprises adding thereto after its formation at least one member of the group consisting of compounds of iron, cobalt and nickel and of elements and compounds of the metals of the platinum group.

2. A process for stabilizing preformed acid liquor which comprises adding thereto after its formation at least one member of the group consisting of compounds of copper and silver.

3. A process for stabilizing preformed acid liquor which comprises adding thereto after its formation at least one member of the group consisting of soluble compounds of the metals of the platinum group, of iron, cobalt and nickel.

4. A process for stabilizing preformed acid liquor which comprises adding thereto after its formation at least one member of the group consisting of soluble compounds of copper and silver.

5. A process for stabilizing preformed acid liquor which comprises adding thereto after its formation a soluble cyano compound of a metal of the group consisting of metals of the platinum group, iron, cobalt and nickel.

6. A process for stabilizing preformed acid liquor which comprises adding thereto after its formation a soluble cyano compound of a metal of the group consisting of copper and silver.

7. A process for stabilizing preformed acid liquor which comprises adding thereto after its formation a soluble complex metallo compound obtained by the reaction of a non-complex compound of a metal of the group consisting of metals of the platinum group, iron, cobalt and nickel, with carbon monoxide.

8. A process for stabilizing preformed acid liquor which comprises adding thereto after its formation a soluble complex metallo compound obtained by the reaction of a non-complex compound of a metal of the group consisting of metals of the platinum group, iron, cobalt and nickel, with nitric oxide.

9. A process for stabilizing preformed acid liquor which comprises adding thereto after its formation a soluble complex metallo compound obtained by the reaction of a non-complex compound of a metal of the group consisting of metals of the platinum group, iron, cobalt and nickel, with ethylene.

10. A process for stabilizing preformed acid liquor which comprises adding thereto after its formation a soluble complex metallo compound obtained by the reaction of a non-complex compound of a metal of the group consisting of copper and silver with carbon monoxide.

11. A process for stabilizing preformed acid liquor which comprises adding thereto after its formation a soluble complex metallo compound obtained by the reaction of a non-complex compound of a metal of the group consisting of copper and silver with nitric oxide.

12. A process for stabilizing preformed acid liquor which comprises adding thereto after its formation a soluble complex metallo compound obtained by the reaction of a non-complex compound of a metal of the group consisting of copper and silver with ethylene.

ADRIANUS JOHANNES van PESKI.